(12) United States Patent
Kuroishi

(10) Patent No.: US 10,142,534 B2
(45) Date of Patent: Nov. 27, 2018

(54) IMAGE-CAPTURING AND IMAGE-DISTRIBUTING SYSTEM FOR AUTOMATICALLY OR MANUALLY CAPTURING IMAGE OF USER CARRYING MOBILE COMMUNICATION TERMINAL

(71) Applicant: bianconero, Inc., Osaka (JP)

(72) Inventor: Tomonobu Kuroishi, Osaka (JP)

(73) Assignee: bianconero, Inc., Osaka (JP)

( * ) Notice: Subject to any disclaimer, the term of this patent is extended or adjusted under 35 U.S.C. 154(b) by 0 days.

(21) Appl. No.: 15/522,840

(22) PCT Filed: Aug. 6, 2015

(86) PCT No.: PCT/JP2015/072329
§ 371 (c)(1),
(2) Date: Apr. 28, 2017

(87) PCT Pub. No.: WO2016/072121
PCT Pub. Date: May 12, 2016

(65) Prior Publication Data
US 2017/0318215 A1   Nov. 2, 2017

(30) Foreign Application Priority Data

Nov. 7, 2014  (JP) ................................ 2014-239307
Mar. 10, 2015 (JP) ................................ 2015-046614

(51) Int. Cl.
*H04N 5/232*    (2006.01)
*G01S 5/02*     (2010.01)
(Continued)

(52) U.S. Cl.
CPC ....... *H04N 5/23206* (2013.01); *G01S 5/0252* (2013.01); *G01S 11/06* (2013.01);
(Continued)

(58) Field of Classification Search
CPC .. H04N 5/23206; H04N 21/274; H04N 5/765; H04N 5/232; H04N 5/225;
(Continued)

(56) References Cited

U.S. PATENT DOCUMENTS 8,891,950 B2    11/2014  Oyama
2002/0001468 A1  1/2002  Kaku
(Continued)

FOREIGN PATENT DOCUMENTS

JP    2002320172 A    10/2002
JP    2003116127 A     4/2003
(Continued)

OTHER PUBLICATIONS

Wikipedia, "Exif", 1995.

*Primary Examiner* — Nhan T Tran
(74) *Attorney, Agent, or Firm* — The Webb Law Firm

(57) ABSTRACT

A system and a method in which image-capturing is effected automatically or manually. When a user-carried mobile terminal receives a near field wireless signal from a near field wireless signal transmitting station installed in an image-capturing field area, it is determined that a user is present within the image-capturing field of the externally installed image-capturing device and the user-carried communication terminal transmits automatically or manually an image-capturing request to the externally installed image-capturing device. In response, the externally installed image-capturing device effects image-capturing and then transmits the obtained image to an image server. After transmission of the image-capturing request, the user-carried mobile communication terminal makes a downloading request to the image server and effects downloading via a network and the downloaded data is automatically stored within the user-carried mobile communication terminal.

10 Claims, 3 Drawing Sheets

(51) Int. Cl.
*H04M 11/00* (2006.01)
*H04M 1/00* (2006.01)
*H04N 5/225* (2006.01)
*H04N 5/765* (2006.01)
*H04N 21/274* (2011.01)
*H04W 4/80* (2018.01)
*H04L 29/08* (2006.01)
*G01S 11/06* (2006.01)
*H04L 29/06* (2006.01)
*H04W 4/021* (2018.01)
*H04W 88/02* (2009.01)

(52) U.S. Cl.
CPC ...... *H04L 63/0428* (2013.01); *H04L 63/0492* (2013.01); *H04L 67/125* (2013.01); *H04L 67/18* (2013.01); *H04M 1/00* (2013.01); *H04M 11/00* (2013.01); *H04N 5/225* (2013.01); *H04N 5/232* (2013.01); *H04N 5/765* (2013.01); *H04N 21/274* (2013.01); *H04W 4/021* (2013.01); *H04W 4/80* (2018.02); *H04W 88/02* (2013.01)

(58) Field of Classification Search
CPC ......... H04W 4/008; H04W 4/80; H04W 4/08; H04W 88/02; H04W 4/021; H04L 67/18; H04L 63/0492; H04L 63/0428; H04L 67/125; G01S 11/06; G01S 5/0252; H04M 1/00; H04M 11/00
See application file for complete search history.

(56) References Cited

U.S. PATENT DOCUMENTS

| | | | |
|---|---|---|---|
| 2003/0081119 | A1 | 5/2003 | Robinson et al. |
| 2004/0239777 | A1* | 12/2004 | Nakamura ......... H04N 1/00132 348/239 |
| 2005/0001024 | A1 | 1/2005 | Kusaka et al. |
| 2009/0174763 | A1 | 7/2009 | Bengtsson et al. |
| 2010/0113068 | A1 | 5/2010 | Rothschild |
| 2010/0214398 | A1 | 8/2010 | Goulart et al. |
| 2011/0013032 | A1* | 1/2011 | Hatanaka ........... H04N 5/23203 348/211.4 |
| 2011/0256886 | A1* | 10/2011 | Velusamy ............. G01S 5/0009 455/456.1 |
| 2014/0004793 | A1* | 1/2014 | Bandyopadhyay ... H04W 4/008 455/41.1 |
| 2015/0334185 | A1 | 11/2015 | Yoshida |

FOREIGN PATENT DOCUMENTS

| | | |
|---|---|---|
| JP | 2003179840 A | 6/2003 |
| JP | 200440736 A | 2/2004 |
| JP | 2004289433 A | 10/2004 |
| JP | 200586504 A | 3/2005 |
| JP | 2005167504 A | 6/2005 |
| JP | 200781621 A | 3/2007 |
| JP | 2008118679 A | 5/2008 |
| JP | 201139737 A | 2/2011 |
| JP | 2013168886 A | 8/2013 |
| JP | 2013236224 A | 11/2013 |
| JP | 201499763 A | 5/2014 |
| WO | 2014123103 A1 | 8/2014 |
| WO | 2014155548 A1 | 10/2014 |

* cited by examiner

IMAGE-CAPTURING AND IMAGE-DISTRIBUTING SYSTEM FOR AUTOMATICALLY OR MANUALLY CAPTURING IMAGE OF USER CARRYING MOBILE COMMUNICATION TERMINAL

CROSS-REFERENCE TO RELATED APPLICATIONS

This application is the United States national phase of International Application No. PCT/JP2015/072329 filed Aug. 6, 2015, and claims priority to Japanese Patent Application Nos. 2014-239307 and 2015-046614, filed Nov. 7, 2014, and Mar. 10, 2015, respectively, the disclosures of which are hereby incorporated in their entirety by reference.

TECHNICAL FIELD OF THE INVENTION

This disclosure relates to a technique of automatically or manually image-capturing a user carrying a mobile communication terminal and automatically storing acquired image data in this mobile communication terminal.

BACKGROUND OF THE INVENTION

As a conventional technique, Patent Document 1 includes description of an image-capturing system that uses an image-capturing gate and is capable of viewing/acquiring a photo later, in which an ID number of the mobile communication terminal is used in combination as a means for implementing the technique.

However, with the technique disclosed in Patent Document 1, an ID such as a mobile phone number is required for user identification, and a prior registration with a center server which manages the ID is required also. Further, it is also required to determine separately with using an entrance/exit gate in order to confirm that a user is visiting a site of interest.

Patent Document 2 discloses a technique according to which when communication becomes possible between a wireless tag carried by a user and a communication base station via a near field wireless communication, an image server manages an image captured by a camera in operative correlation with and ID acquired from the wireless tag, thus allowing downloading thereof from an external terminal via the internet.

Patent Document 3 too, like Patent Document 2, discloses a technique that causes an image-capturing subject user to carry a wireless tag for capturing images.

However, with the techniques disclosed in Patent Document 2 and Patent Document 3, firstly, there arises a trouble of distributing and collecting wireless tags to/from image-capturing subject users. Further, as it is also necessary to provide additionally a detecting means for detecting entrance of a wireless tag into an image-capturing area, installment costs for each image-capturing area will increase disadvantageously. Further, with both of these methods or techniques, a user is to carry a wireless tag. And, a communication base station needs to be provided and installed in the camera image-capturing area. Moreover, since the image-capturing subject does not carry a communication terminal, it is also necessary to download the image later with using a password via an external terminal such as a personal computer or the like. The image too needs to be stored in a server for a long time, so there remains some concern respecting the security aspect also.

Patent Document 4 discloses a technique according to which a current location (whereabouts) of a digital camera is reported via a near field communication and image-capturing data is forwarded via a long distance communication to an available terminal.

However, in the technique disclosed in Patent Document 4, the near field wireless communication is employed for the purpose of reporting to a subject user, so the subject is not necessarily be present in the image-capturing area of the camera. This is originally a technique that takes into consideration only manual image-capturing, not allowing automatic image-capturing. Further, this technique suffers another shortcoming that installment cost at an image-capturing point is increased as the output of the near field wireless communication is attenuated on the transmission origin side.

A technique disclosed in Patent Document 5 concerns image-capturing range identification utilizing wireless system having directivity.

However, with the technique disclosed in Patent Document 5, the technique employs one or more wireless transmitting station(s) having directivity for the purpose of limiting the image-capturing area, so the technique does not allow use of commercially available products without any modifications therefor. Further, as the directivity of wireless communication involves factors of adjustment which increase depending on a place of its installment. Thus, like Patent Document 4 above, this technique too suffers increase of installment cost for each image-capturing area.

Patent Document 6 discloses an image-capturing system and method for automatically image-capturing a subject which moves together with a mobile terminal carried thereby. This technique is constituted of a mobile terminal carried by a subject, a position management server, an image-capturing device, a service server for image accumulation, and an image analyzing server.

However, with the technique disclosed in Patent Document 6, as this technique utilizes GPS as a position determining means in the mobile terminal carried by a subject, the technique suffers significant error. Further, the technique requires a position management server as a constituent thereof. As the communication between the carried mobile terminal and the image-capturing device is effected via a near field wireless communication, shortness of the distance is ensured in advance. However, like Patent Document 4, there is no guarantee of the subject being captured within the image-capturing area of the image-capturing device. For this reason, the technique requires the image analyzing server additionally.

PRIOR ART DOCUMENTS

Patent Documents

Patent Document 1: Japanese Unexamined Patent Application Publication No. 2002-320172 (JP 2002-320172 A)
Patent Document 2: Japanese Unexamined Patent Application Publication No. 2003-116127 (JP 2003-116127 A)
Patent Document 3: Japanese Unexamined Patent Application Publication No. 2004-289433 (JP 2004-289433 A)
Patent Document 4: Japanese Unexamined Patent Application Publication No. 2007-081621 (JP 2007-081621 A)
Patent Document 5: Japanese Unexamined Patent Application Publication No. 2008-118679 (JP 2008-118679 A) (now granted under Japanese Patent No. 4382846)

Patent Document 6: Japanese Unexamined Patent Application Publication No. 2013-168886 (JP 2013-168886 A)

SUMMARY OF THE INVENTION

Problem(s) to be Solved by Invention

In view of the above-described shortcomings of the prior art, the object of the present invention is to provide an image-capturing system which is provided as a more simple configuration and which yet provides improved convenience for a user who carries a mobile communication terminal.

Solution(s) to the Problem(s)

According to the present invention, an image-capturing and image-distributing system comprises:
a near field wireless signal transmitting station;
a user-carried mobile communication terminal;
an image-capturing device; and
an image server;
wherein the near field wireless signal transmitting station has a system near field wireless signal transmitting function according to which a near field wireless signal containing encrypted image-capturing condition information is transmitted via a near field wireless communication in order to identify that a user has entered an image-capturing target area;
wherein the user carried mobile communication terminal has a system client management function according to which whether image-capturing is possible or not is determined based on the image-capturing condition information decrypted from the received near field wireless signal and then an image-capturing request including a user presence area within an image-capturing field is transmitted automatically or manually to the image-capturing device if this image-capturing is determined appropriate;
wherein the image-capturing device has a system client image-capturing function according to which the image-capturing of the user presence area is effected based on the image-capturing request and then the acquired image data is transmitted to the image server; and
wherein the image server has a system image server function according to which the acquired image data is temporarily stored in correlation with an image-capturing location and an image-capturing time/date, and the acquired image data is transmitted to the user-carried mobile communication terminal in response to a download request therefrom which designates the image-capturing location and the image-capturing time/date.

Incidentally, the language "user-carried mobile communication terminal" as used herein refers to a mobile communication terminal that is carried by a user.

The near field wireless signal transmitting station is provided and installed for making sure that the user of interest is present within the image-capturing field of the image-capturing device. However, depending on an installed position of the image-capturing device, there may occur a case when it is not possible for the user to enter an area outside the image-capturing field (e.g. when the image-capturing device per se is installed at a corner of a room and its image-capturing field comprises the center direction of the room). In such case, it will not be necessary to dispose the near field wireless signal transmitting station at some position physically different from the installed position of the image-capturing device. Then, in order to realize a more simple installment, the system near field wireless signal transmitting function of the near field wireless signal transmitting station can be incorporated in the image-capturing device. Though this being an exceptional (or optional) arrangement of the image-capturing and image-distributing system of the present invention, this arrangement is defined here in claim 2 anyway.

When the user-carried mobile communication terminal downloads acquired image data, this is effected via a wireless communication by a communication network of the mobile communication provider company or Wi-Fi, etc. In a standard network configuration, it is not possible for a user-carried mobile communication terminal to make direct access to the image-capturing device. However, in case the network configuration of interest is made explicit through limitation of the institution and if direct access from the user-carried mobile communication terminal to the image-capturing device is possible, then, an image server need not necessarily be provided separately, but the system image server function of the image server can be included in the image-capturing device per se. This configuration is defined here in claim 3.

This image-capturing and image-distributing system is characterized in that acquired image data is stored in near real time within a user-carried mobile terminal. Yet, depending on a skill of the user, a similar effect and convenience can be obtained with utilization of a cloud storage. To this end, the image server can optionally have a function of storing in a user's cloud storage if a downloading request is issued form the user-carried mobile terminal to the image server. This configuration is defined here in claim 4.

A basic level of security is inherently ensured in the image-capturing and image distribution system of the present invention. Yet, for realization of even higher level of security, it is conceivable to implement a method of changing a transmission signal transmitted from the near field wireless signal transmitting station in accordance with the date of transmission. For realization of such change of transmission signal in accordance with the date of transmission, it is necessary to replace the near field wireless signal transmitting station by some costly arrangement. However, with reasonable expectation of cost reduction realization in future, the above configuration is defined here in claim 5 anyway.

Claim 6 defines a computer program that is used in the inventive image-capturing and image-distributing system. In this, as the system client management function is executed on the user-carried mobile communication terminal carried by the user, convenience of the system can be provided. The user-carried mobile communication terminal refers typically to a high-functionality mobile phone terminal (so-called smart phone) in this invention. Yet, it is understood that the language is inclusive also of any other mobile terminal having a communication function, such as a wrist-watch type communication device, an eye-glass type communication device.

Further, claim 6 additionally defines a program for realizing the function of the image-capturing device on a personal computer, a tablet terminal, a high-functionality mobile phone terminal (so-called smart phone). This program will have the system client image-capturing function in the case of the system configuration defined in claim 1, or the system near field wireless signal transmitting function and the system client image-capturing function in the case of the system configuration defined in claim 2, or the system client image-capturing function and the system image server function in the case of the system configuration defined in claim 3, respectively.

Effect(s) of the Invention

The information transmitted by the near field wireless communication transmitting station includes a radio field intensity, in addition to an image-capturing device ID. With this, an area having a predetermined distance radius around the near field wireless communication transmitting station can be made an image-capturing area, so that the device cost of the near field wireless communication transmitting station per se can be reduced and the degree of freedom in its installment can be increased, whereby the installment cost for each image-capturing area can be reduced advantageously. Further, post-installment adjustment operation can be carried out conveniently.

The devices to be installed for each image-capturing area are the near field wireless communication transmitting station and the image-capturing device. In this invention, the near field wireless communication transmitting station to be used can be any standard commercially available product. The image-capturing device can be either a specially made device or a standard smart phone terminal. Thus, the installment cost for each image-capturing area can be minimized.

Since the near field wireless communication transmitting station is provided and installed in advance within the image-capturing field of the image-capturing device, according to the present invention, the presence of the user within the image-capturing field of the image-capturing device is guaranteed. This eliminates components additionally required by the convention such as a near field wireless communication transmitting station having directivity, a position management server, an image analyzing server. Thus, together with realization of simplification of the whole system, image-capturing with higher accuracy is made possible as well.

In the present invention, the mobile communication terminal carried by the user effects automatic downloading of image nearly in real time. Thus, as this downloading is effected with the provision of being present "at the particular time" and "at particular location", there is no need for the user to input an ID password or the like. Further, a troublesome preliminary user registration too can be omitted. What is required of the user is only downloading of of a program (so-called "application") suitable for the particular mobile communication terminal carried by this user, so that maximum convenience for the user is provided.

The basic object of the present invention is to eliminate or relieve the troubles for the user. Thus, "automatic downloading to a user-carried mobile communication terminal" is the basic configuration to be provided. However, depending on a skill of the user, a similar advantageous effect can be expected to be achieved with utilization of the cloud storage/computing technique. Thus, in the case of presence of setting of operative linkage established between the mobile communication terminal and a cloud storage, image writing operation to the cloud can be effected in place of the direct downloading to the mobile communication terminal, so that it may be possible that only an image writing operation to the cloud is effected, Further, it becomes possible to arrange such that an image accumulated on the server may be erased in a short time (maximum retention of 2 minutes in the case of a currently tested configuration). So, the security concern for the subject user can be relieved, and simplification of the system is made possible also.

With significant simplification of the system as compared with the convention, the installment can be made more simple and can be provided more economically.

In a theme park or a sightseeing spot or the like where the present system is installed, the user needs only to carry the mobile communication terminal with him/her. With this, the user can obtain photos of e.g. a family including the user himself or herself, without this user being aware of the same.

Conventionally, troublesome operations such as giving away temporarily user's mobile communication terminal at another's hand or using such a mechanism as a self-timer at the time of image-capturing were required. Whereas, with the inventive system described above, the user can keep the mobile communication terminal at hand and the user himself/herself can be included in an image to be taken.

EMBODIMENT(S) OF THE INVENTION

Figure 1:
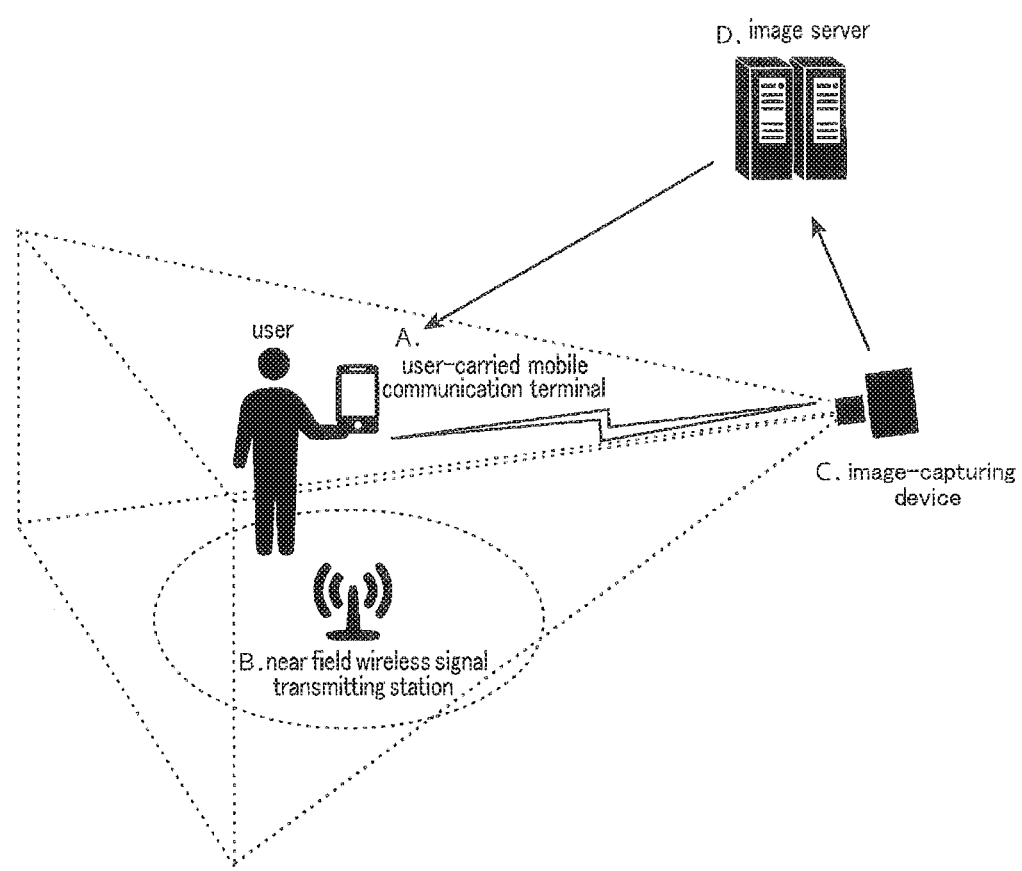
FIG. 1 is a configuration diagram of a system according to the present invention.
Figure 2:
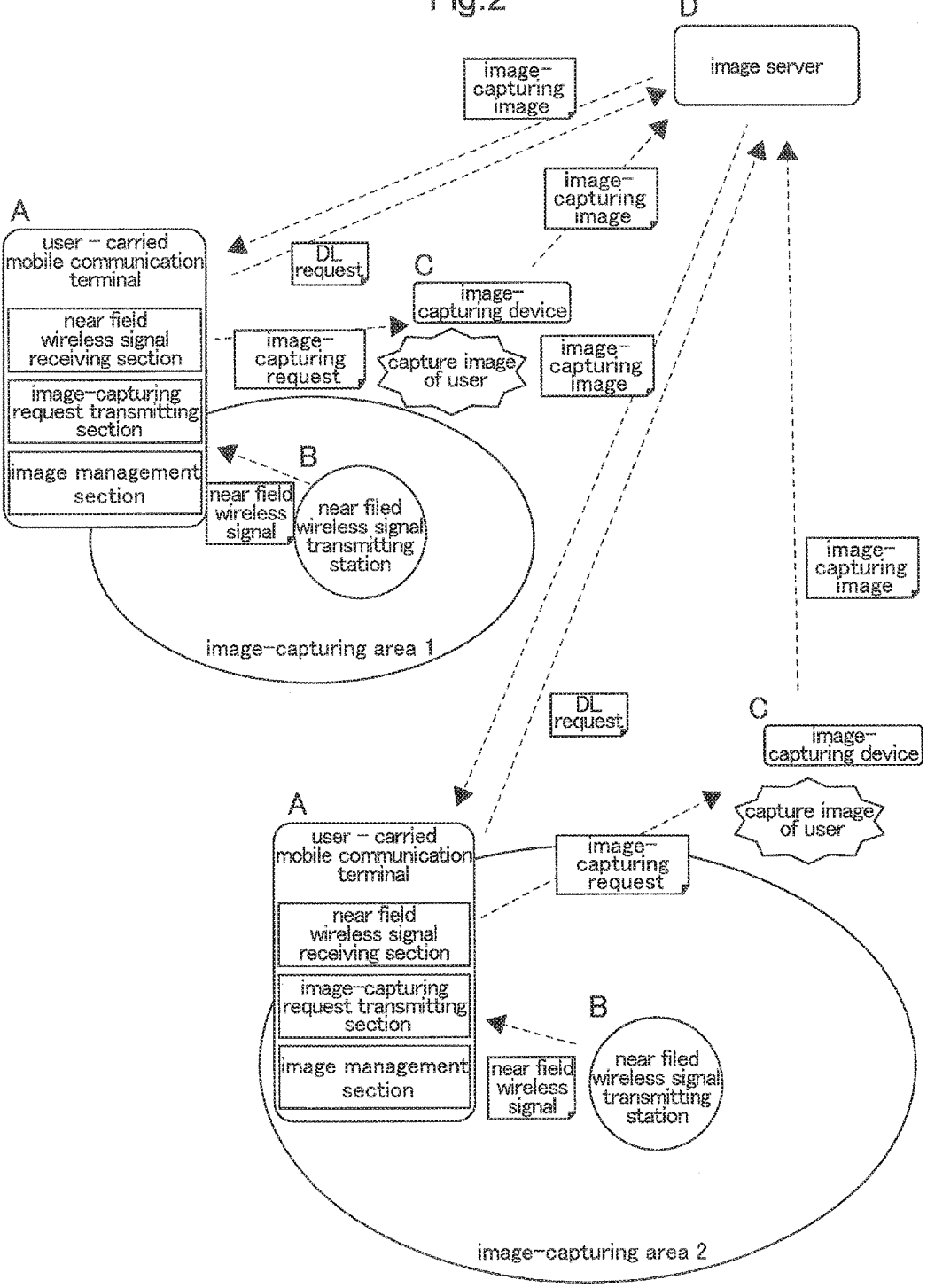
FIG. 2 is a schematic showing control principle of the inventive system.

As shown in FIG. 1 and FIG. 2, an image-capturing and image-distributing system according to this embodiment includes a user-carried mobile communication terminal A, a near field wireless signal transmitting station B, an image-capturing device C and an image server D. The user-carried mobile communication terminal A (to be referred to simply as "terminal A" hereinafter) is a mobile (or portable) communication terminal carried by a user who is an image-capturing subject and this can typically be a smart phone. A basic function of this invention included in the terminal A is realized by execution of a program (to be referred to as "application" hereinafter) installed in the terminal A. The near field wireless signal transmitting station B has a function of transmitting (or broadcasting) near field wireless signal that can be received by the terminal A. The near field wireless signal transmitting station B is installed in each image-capturing area (shown as an image-capturing area 1, an image-capturing area 2, . . . in the exemplary illustration of FIG. 2). The image-capturing device C has an image-capturing function for image-capturing each image-capturing area as its image-capturing field as well as a communicating function. The image-capturing device C will effect image-capturing operations in repetition as long as the device C is receiving an image-capturing request from the terminal A and will forward the generated images to the image server D. The image server D will receive the images forwarded from one or more image-capturing devices and store them therein temporarily. The stored images will be transmitted to a terminal A which has sent a downloading request to be stored in accumulation in this terminal A.

When a user as an image-capturing subject leaves the image-capturing area 1, the terminal A carried by this user will stop receiving any near field wireless signals from the near field wireless signal transmitting station B belonging in this image-capturing area 1. As a result, transmission of a new image-capturing request from the terminal A to the image-capturing device C and transmission of a new downloading request to the image server D will be stopped, and new image-capturing operation or new image distribution by this user in the image-capturing area 1 will be stopped also. Yet, it is to be noted that distribution of image in response to a downloading request transmitted within the image-capturing area 1 will be continued until time-out after the exit from the image-capturing area 1. The image distribution is effected not via the near field wireless communication, but via a long distance wireless communication, so that success ratio of image distribution can be increased even when the user keeps moving or the image-capturing area is small.

The image-capturing device C which has received an image-capturing request will effect image-capturing of the image-capturing field and will then transmit it to the image server D together with and in operative linkage with an image-capturing location information and an image-capturing time/date information. Incidentally, if a plurality of users are present at a time within the image-capturing area 1, the image-capturing device C may receive image-capturing requests from a plurality of terminals A. Then, the image-capturing device A will try to meet the image-capturing requests from all of these terminals A. However, the image-capturing device per se is set with a continuous image-capturing interval of 1 second approximately (a value obtained with the currently tested configuration). Thus, if a plurality of image-capturing requests are received within this interval, the time/date of the image-capturing request will be compared with the most recent (newest) time/date of image-capturing request and will ignore the most recent image-capturing request of the difference therebetween shorter than the above-described continuous image-capturing interval.

After the terminal A transmits an image-capturing request to the image-capturing device C, this terminal A will transmit a downloading request to the image server D in order to obtain an image corresponding to this image-capturing request. This downloading request contains an image-capturing device ID and the information of the image-capturing request data in encrypted forms, so that the image server D upon receiving this downloading request will transmit to the terminal A an image corresponding to this image-capturing request data or an image which was taken at a time/date nearest the image-capturing request date. With this configuration, even if many terminals A are present at a time within a single image-capturing area, it is still possible to meet downloading requests from all of these terminals A.

When the user exiting the image-capturing area 1 now enters the image-capturing area 2, in response to a near field wireless signal from the near field wireless signal transmitting station B belonging in this image-capturing area 2, an image-capturing request for the image-capturing area 2 as an image-capturing field will be transmitted from the terminal A carried by this user to the image-capturing device C. Further, a downloading request will be transmitted to the image server D. With this, similarly to the above, the image of the image-capturing area 2 will be stored in accumulation in the terminal A carried by the user.

Figure 3:
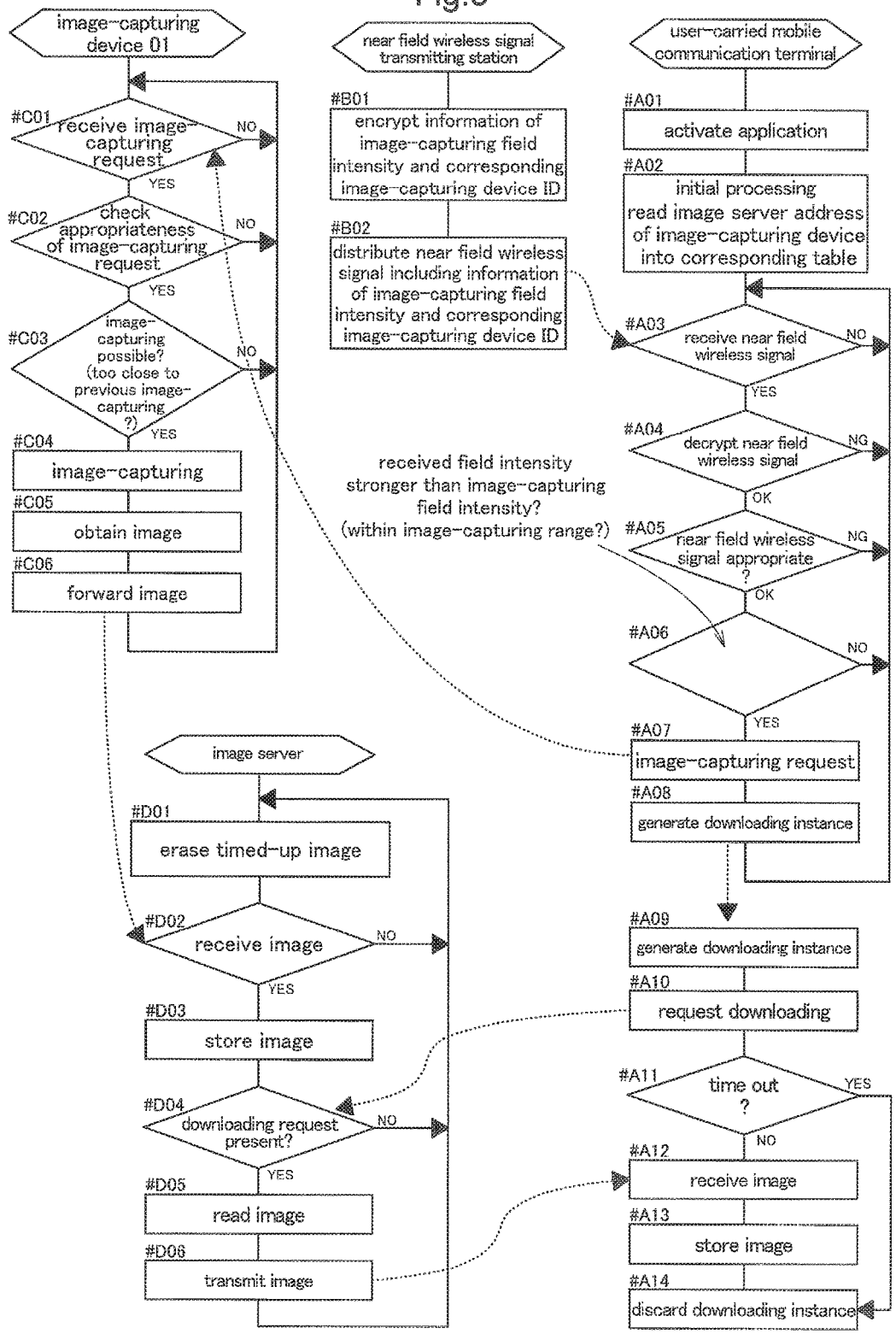
FIG. 3 is a flowchart illustrating a flow of control of the inventive image-capturing and image-distributing system.

Next, with reference to the flowchart shown in FIG. 3, an example of flow of control executed among the terminal A, the near field wireless signal transmitting station B, the image-capturing device C and the image server D will be described in more detail.

When a user carrying a terminal A, which is a smart phone in this example, enters a sightseeing place such as a theme park, an application based on the present invention and installed in this terminal A will be activated (#A01). Upon activation of the application, a near field wireless signal receiving section, an image-capturing request transmitting section and an image management section will be configured within the terminal A. Then, as an initial processing, the activated application will read out addresses of image servers D to which images of the respective image-capturing devices C installed in this sightseeing location are to be distributed (#A02). Further, initial setting operations of various flags and coefficients will be effected (#A02). The near field wireless signal receiving section has following functions. Namely, this section will receive an encrypted near field wireless signal from the near field wireless signal transmitting station B which is disposed in correspondence with the image-capturing field of the image-capturing device C (#A03) and then will decrypt the encrypted near field wireless signal from the near field wireless signal transmitting station B (#A04). Then, the section will determine whether this near field wireless signal per se is appropriate for this theme park or not (#A05) and will also make comparison between an image-capturing field intensity recorded within the near field wireless signal and a received field intensity received by the near field wireless signal receiving section, and then will determine that the user carrying the terminal A is present within the image-capturing area if the received field intensity is stronger (#A06). The image-capturing request transmitting section has a function of transmitting an image-capturing request for requesting image-capturing of the image-capturing field to the image-capturing device C (#A07). The image management section generates a new downloading instance within its image management section (#A08, #A09). The downloading instance has a function of transmitting, to the image server D which manages the images acquired by the image-capturing device C, a downloading request requesting downloading of the image obtained within a time period defined by the image-capturing request (#A10). The downloading instance waits for a response from the image server D (#A11), receives the image (#A12) and then stores the received image in a memory (#A13) and discards this downloading instance itself subsequently (#A14).

All of the near field wireless signal transmitting stations B transit near field wireless signals in distribution respectively (#B02). When a user approaches an image-capturing area where a near field wireless signal transmitting station B is provided, the terminal A carried by this user will receive a near field wireless signal from this near field wireless signal transmitting station B (Yes branching at #A03). Then, based on this reception of the near field wireless signal, the terminal A will read out a communication address of the image-capturing device C corresponding to the near field wireless signal transmitting station B transmitting this near field wireless signal and the image server D (#A02) and then will transmit an image-capturing request to the image-capturing device C (#A07). Further, the terminal A will transmit a downloading request to the image server D in order to effect downloading of the image generated by this image-capturing device C (#A10). With this, the terminal A will receive the image transmitted from the image server D (#A12) and store it into the internal memory of the terminal A or in an external memory or storage (#A13). The above processes from step #A03 to step #A14 will be effected in repetition as long as the reception of the near field wireless signal is continued and all of the conditions are met.

The image-capturing device C, when activated, will check whether the image-capturing request from the terminal A has been received or not (#C01). If the image-capturing request has been received (Yes branching at #C01), the device C will effect checking of appropriateness whether the received image-capturing request is appropriate or not (#C02) and determine whether image-capturing is possible or not (#C03) and then will effect image-capturing (#C04) and obtain an image (#C05). The obtained image will be forwarded to the image server D (#C06). The above processes from step #C01 to step #C06 will be effected in repetition as long as reception of an image-capturing request from any terminal A is present.

The image server D transmits the captured image forwarded from the image-capturing device C to the terminal A from which the downloading request transmitted. In this, there is set a time period of retaining the forwarded image. Upon lapse of the predetermined retention period, the image will be erased. Normally, this predetermined period will be set to few tens of seconds or a few minutes, so that security of privacy can be ensured. To this end, the image server D constantly checks, in the course of the processes repeated as above, whether the retention period of a forwarded image has exceeded the predetermined period or not. If it is found that the retention period of image has exceeded the predetermined period, this image ("timed-up image") will be erased (#D01). Then, it is checked whether an image has been received from an image-capturing device C or not (#D02). A received image, if any, will be temporarily stored and this image will be assigned with a reception time for checking the retention period as described above (#D03). Subsequently, it is checked whether there exists a downloading request from the terminal A or not (#D04). If a downloading request is present (Yes branching at #D04), the image stored at this timing will be read out (#D05) and this image will be transmitted to the terminal A which transmitted the above downloading request (#D06) and then the process returns to step #D01. Incidentally, if a downloading request is absent at step #D04, the process will return to step #D01.

INDUSTRIAL APPLICABILITY

Installment at a theme park, a sightseeing spot, etc. is conceivable.

What is claimed is:

1. An image-capturing and image-distributing system comprising:
   a near field wireless signal transmitting station;
   a user-carried mobile communication terminal;
   an image-capturing device associated with an image-capturing area; and
   an image server;
   wherein the near field wireless signal transmitting station is configured to:
     transmit a near field wireless signal containing encrypted image-capturing condition information via a near field wireless communication in order to identify that a user has entered the image-capturing area;
   wherein the user carried mobile communication terminal is configured to:
     receive and decrypt the near field wireless signal containing the encrypted image-capturing condition information,
     determine that the user has entered the image-capturing area based on the near field wireless signal containing the encrypted image-capturing condition information, and
     transmit an image-capturing request including a user presence area within the image-capturing area to the image-capturing device based on determining that the user has entered the image-capturing area;
   wherein the image-capturing device is configured to:
     capture an image of the user presence area based on the image-capturing request, and
     transmit acquired image data associated with the image to the image server;
   wherein the image server is configured to:
     store the acquired image data in correlation with an image-capturing location and an image-capturing time/date, and
     transmit the acquired image data to the user-carried mobile communication terminal in response to receiving a download request from the user-carried mobile communication terminal which designates the image-capturing location and the image-capturing time/date.

2. The image-capturing and image-distributing system according to claim 1, wherein the image-capturing device includes the near field wireless signal transmitting station.

3. The image-capturing and image-distributing system according to claim 1, wherein the image-capturing device includes the image server.

4. The image-capturing and image-distributing system according to claim 1, wherein the image server is further configured to transmit the acquired image data to a cloud storage in response to receiving a cloud-storage request from the user-carried communication terminal.

5. The image-capturing and image-distributing system according to claim 1, wherein the near field wireless signal transmitting station is further configured to generate the encrypted image-capturing condition information dynamically.

6. A method comprising:
   transmitting, with a near field wireless signal transmitting station via a near field wireless communication, a near field wireless signal containing encrypted image-capturing condition information in order to identify that a user has entered an image-capturing area;
   receiving and decrypting, with a user-carried mobile communication terminal, the near field wireless signal containing the encrypted image-capturing condition information;
   determining, with the user-carried mobile communication terminal, that the user has entered the image-capturing area based on the near field wireless signal containing the encrypted image-capturing condition information;
   transmitting, with the user-carried mobile communication terminal, an image-capturing request including a user presence area within the image-capturing area to an image-capturing device associated with the image-capturing area based on determining that the user has entered the image capturing area;
   capturing, with the image capturing device, an image of the user presence area based on the image-capturing request;
   transmitting, with the image capturing device, acquired image data associated with the image to an image server;
   storing, with the image server, the acquired image data in correlation with an image-capturing location and an image-capturing time/date; and
   transmitting, with the image server, the acquired image data to the user-carried mobile communication terminal in response to receiving a download request from the user-carried mobile communication terminal which designates the image-capturing location and the image-capturing time/date.

7. The image-capturing and image-distributing system according to claim 1, wherein the user-carried mobile communication device is further configured to determine that the user has entered the image capturing area is based on a comparison between an image-capturing field intensity recorded within the near field wireless signal and a received field intensity of the near field wireless signal received by the user carrier mobile communication terminal.

8. The method according to claim 6, wherein determining that the user has entered the image capturing area is based on a comparison between an image-capturing field intensity recorded within the near field wireless signal and a received field intensity of the near field wireless signal received by the user carrier mobile communication terminal.

9. The method according to claim 6, wherein the image-capturing device includes the near field wireless signal transmitting station.

10. The method according to claim 6, wherein the image-capturing device includes the image server.

\* \* \* \* \*